(12) United States Patent
Suklja

(10) Patent No.: US 11,625,628 B2
(45) Date of Patent: Apr. 11, 2023

(54) METHOD OF IMPROVING PROCESSING EFFICIENCY DECISION MAKING WITHIN A COMPUTER SYSTEM

(71) Applicant: Daniel Suklja, Menifee, CA (US)

(72) Inventor: Daniel Suklja, Menifee, CA (US)

( * ) Notice: Subject to any disclaimer, the term of this patent is extended or adjusted under 35 U.S.C. 154(b) by 1169 days.

(21) Appl. No.: 15/862,631

(22) Filed: Jan. 5, 2018

(65) Prior Publication Data

US 2019/0213491 A1 Jul. 11, 2019

(51) Int. Cl.
*G06F 16/00* (2019.01)
*G06N 5/045* (2023.01)
(Continued)

(52) U.S. Cl.
CPC ......... *G06N 5/045* (2013.01); *G06F 16/2246* (2019.01); *G06F 16/282* (2019.01); *G06F 16/35* (2019.01); *G06N 20/00* (2019.01)

(58) Field of Classification Search
CPC .. A63F 13/216; A63F 2300/301; A63F 13/02; A63F 13/816; A63F 2300/308; A63F 2300/8082; A63F 13/213; A63F 13/215; A63F 13/26; A63F 13/422; A63F 13/5375; A63F 13/54; A63F 13/55; A63F 13/65; A63F 13/79; A63F 13/798; A63F 2300/1093; A63F 2300/201; A63F 2300/203; A63F 2300/204; A63F 2300/303; A63F 2300/6045; A63F 2300/6676; E21B 44/00; E21B 21/08; E21B 44/005; E21B 44/02; E21B 49/08; E21B 41/0092; E21B 43/00; E21B 44/04; E21B 49/00; E21B 49/10; E21B 7/00; E21B 7/04; E21B 31/107; G06F 30/20; G06F 11/1441; G06F 11/1464; G06F 11/2023; G06F 11/2041; G06F 11/2097; G06F 12/084; G06F 16/13; G06F 16/182; G06F 16/1858; G06F 2212/1024; G06F 2212/154; G06F 2212/608; G06F 3/0611; G06F 3/064; G06F 3/0643; G06F 3/0659; G06F 3/0661; G06F 3/067; G06F 11/3688; G06F 16/24578; G06F 16/437; G06F 16/438; G06F 16/637; G06F 16/686

See application file for complete search history.

(56) References Cited

U.S. PATENT DOCUMENTS

2007/0220342 A1* 9/2007 Vieira ................. G06F 11/3688
714/33
2014/0282586 A1* 9/2014 Shear ...................... H04L 47/70
718/104

(Continued)

*Primary Examiner* — Shyue Jiunn Hwa
(74) *Attorney, Agent, or Firm* — Steven J. Malone; Malone IP Law

(57) ABSTRACT

The method disclosed herein includes preprocessing large amounts of input data into a smaller input data sets based on first predetermined associations, sorting the smaller input data sets into groups based on second predetermined associations, filtering grouped data based on upper and lower thresholds, updating a hierarchical processing decision tree within a processor of a computing system, processing data based on the updated hierarchical processing decision tree, and recursively restarting the preprocessing of the large amounts of input data to dynamically update the hierarchical processing decision tree within a user device.

18 Claims, 5 Drawing Sheets

(51) Int. Cl.
    *G06N 20/00*     (2019.01)
    *G06F 16/28*     (2019.01)
    *G06F 16/22*     (2019.01)
    *G06F 16/35*     (2019.01)

(56) References Cited

U.S. PATENT DOCUMENTS

| | | | |
|---|---|---|---|
| 2015/0366518 A1* | 12/2015 | Sampson | A61B 5/7275 600/509 |
| 2016/0097270 A1* | 4/2016 | Pobedinski | E21B 21/08 700/275 |
| 2017/0046510 A1* | 2/2017 | Chen | G06N 20/00 |
| 2018/0189667 A1* | 7/2018 | Tsou | G06N 20/20 |
| 2018/0238951 A1* | 8/2018 | Tao | G06K 9/6296 |
| 2023/0029728 A1* | 2/2023 | Lee | G06F 3/0641 |

\* cited by examiner

METHOD OF IMPROVING PROCESSING EFFICIENCY DECISION MAKING WITHIN A COMPUTER SYSTEM

BACKGROUND

Field of the Invention

This invention relates to preprocessing large data sets into smaller data sets and programming processor functionality based on the smaller data sets.

SUMMARY

The method disclosed herein includes preprocessing large amounts of input data into a smaller input data sets based on first predetermined associations, sorting the smaller input data sets into groups based on second predetermined associations, filtering grouped data based on upper and lower thresholds, updating a hierarchical processing decision tree within a processor of a computing system, processing data based on the updated hierarchical processing decision tree, and recursively restarting the preprocessing of the large amounts of input data to dynamically update the hierarchical processing decision tree.

A method of improving processing efficiency of decision making within a computing system includes one or more processors with non-transitory memory programmed to: preprocess a plurality of data inputs at time $T_1$ to time $T_n$, create a reduced plurality of virtual data inputs based on first predetermined associations of the plurality of data inputs, sort the virtual data inputs into groups based on second predetermined associations within the reduced plurality of virtual data inputs, assign first conditionally weighted variables to each of the groups based at least in part on the second predetermined associations; assign second conditionally weighted variables to each virtual data input of each group based at least in part on a relation to the first conditionally weighted variables of each group, create upper and lower threshold limits for each group related to the first conditionally weighted variables or the second conditionally weighted variables, eliminate all virtual data inputs that fall outside of the upper or the lower threshold limits within each group, update a hierarchical processing decision tree based on the virtual data inputs not eliminated within the groups, start hierarchical processing within the computing system based on the updated hierarchical processing decision tree, and recursively restart the preprocessing of the plurality of data inputs. The plurality of data inputs may be transmitted to the computing system from 10 or more servers in different physical locations. The virtual data inputs may be stored in a database server. The updated hierarchical processing decision tree may be stored in one or more of a user device, a database server, and ASIC (application specific integrated circuit), an FPGA (field programmable gate array), or an FPBGA (fine-pitch ball grid array). The updated hierarchical processing decision tree may be part of a processing blockchain or a parallel processing filter. The plurality of data inputs may be transmitted to the computing system from one or more imaging sensors. The plurality of data inputs may be transmitted to the computing system from one or more biological sensors. The plurality of data inputs may be transmitted to the computing system from one or more Internet devices. The hierarchical processing may produce a real-time bi-stable decision based on a large data set of the plurality of data inputs. The imaging sensors may be used to gather data related to one or more of: fraud, biological identity, pharmaceutical drug creation, pharmaceutical drug testing, positional tracking, location tracking, navigation, electromagnetic imaging, medical procedures, and object detection. Time $T_1$ to time $T_n$ may represent one or more of sets of time in: milliseconds, seconds, minutes, hours, days, weeks, and/or years. The first predetermined associations may be one or more of: statistical associations of the plurality of data inputs, industry associations of the plurality of data inputs, historically learned associations of the plurality of data inputs, or user selected associations of the plurality of data inputs. The second predetermined associations may be one or more of: statistical associations of the plurality of data inputs, industry associations of the plurality of data inputs, historically learned associations of the plurality of data inputs, or user selected associations of the plurality of data inputs. The first conditionally weighted variables may be assigned based on one or more of: changes in relation to time between the groups, changes in relation to time between the virtual data inputs within the group, a predicted rate of change of one or more of the groups, and/or a predicted rate of change of one or more of the virtual data inputs within each group. The second conditionally weighted variables may be assigned based on one or more of: changes in relation to time between the groups, changes in relation to time between the virtual data inputs within the group, a predicted rate of change of one or more of the groups, and/or a predicted rate of change of one or more of the virtual data inputs within each group. The real-time bi-stable decision may cause one or more of the following: unlocking of a secure entry, identity authentication, yes/no decisions, purchase transaction decisions, sell transaction decisions, biological identity decisions, fraud decisions, or providing of a bi-stable output. The updated hierarchical processing decision tree may cause at least one function of the one or more processors to be updated. The updated hierarchical processing decision tree (gate-level-logic) may change a physical processing feature of the at least one or more processors. The updated hierarchical processing decision tree (gate-level-logic) may create a new processor function to be added to the at least one or more processors. The updated hierarchical processing decision tree may cause the at least one or more processors to update a filtering algorithm within the at least one or more processors.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
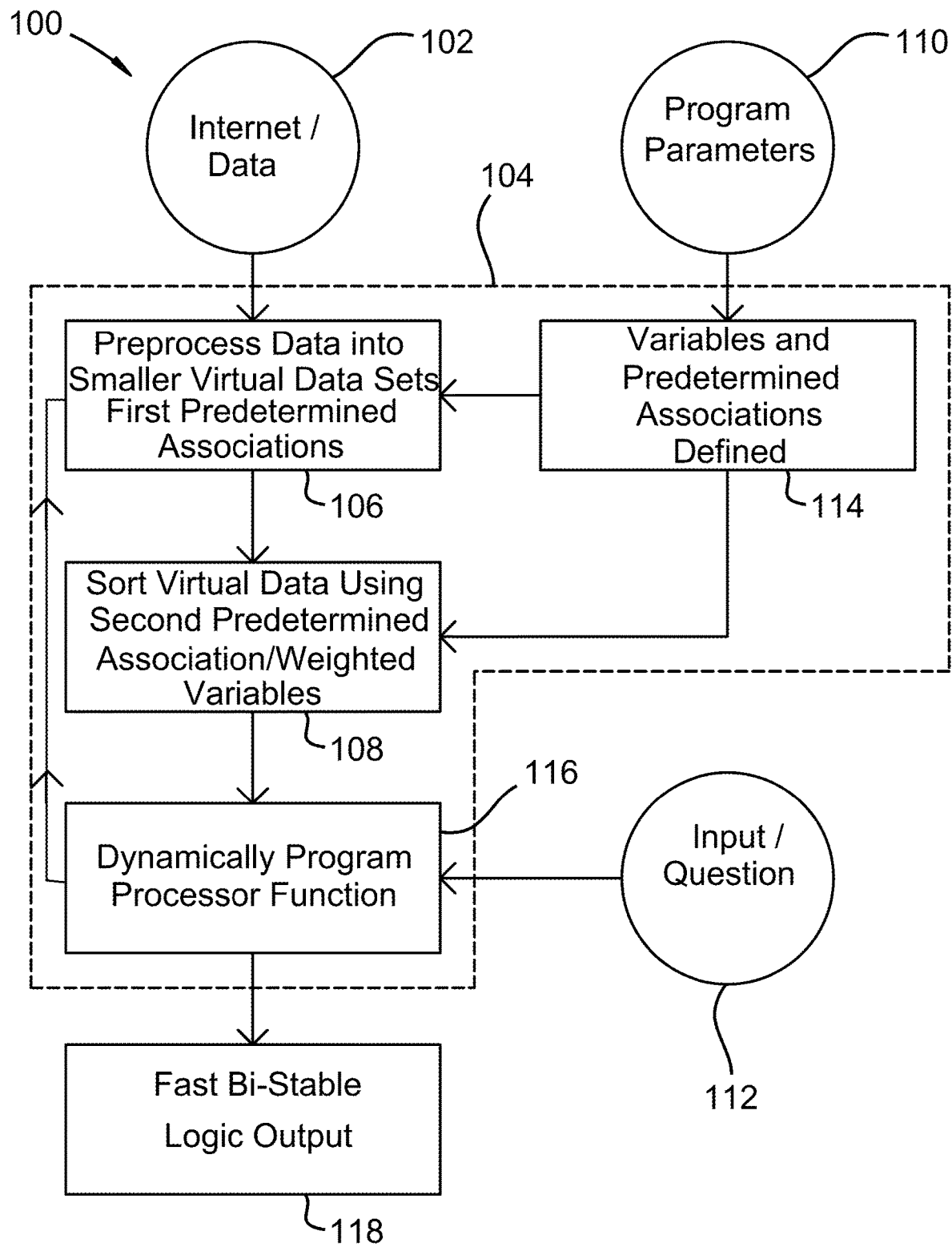
FIG. 1 shows a flow diagram in accordance with an embodiment of the invention.

FIG. 1 shows a flow diagram 100 in accordance with an embodiment of the invention. Data 102 may be obtained from the Internet, Internet sensors, Ethernet sensors, wireless sensors, mesh network devices, local network devices, wide area network devices, stored database records, Internet of Things (IoT) sensors, or from dynamic database records. Data 102 may be defined as networked data, stored data, or sensor data. Data 102 may be received by one or more preprocessors 106 and time and date stamped with intervals $T_1$ to $T_n$. Intervals $T_1$ to $T_n$ may represent actual collection times of data or may represent recursively restarted preprocessing cycles depending on the specific embodiment. Intervals $T_1$ to $T_n$ may be used to form one or more associations between data from the same data sources taken at different times and/or may represent data from various different data sources at similar and/or different times depending on the specific embodiment. Preprocessors 106 may be networked processors, a single device processor, Application Specific Integrated Circuits (ASICs), Field Programmable Gate Arrays (FPGA), or parallel processors used to preprocess data 102 into smaller virtual input sets or smaller data sets. Preprocessors 106 may receive indirect user instructions in the form of programming 114 or direct user instructions by way of input 110. User input 110 may represent programming parameters used to preprocess the data into smaller virtual data input sets 106. Such programming parameters may be used to define first predetermined associations. First predetermined associations may include associations between data within data set 102. The associations may allow filtering, truncating, sorting, extracting, defining, or refining of smaller sets of data from larger data set 102. Examples of first predetermined associations may include associations of one or more of: positional data, timing of collected data, differences of data collected at different times, deltas between similar data, deltas between different data, deltas between the same data sources taken at different times, event data, location data, frequency data, color data, shape data, temperature data, size data, time of day data, date data, amount data, name data, type data, class data, logic data, Boolean logic data, price data, market data, company data, employee data, asset data, and/or product data. The first predetermined association allows data 102 to be preprocessed into a smaller virtual data input set 106. The smaller virtual input data set may then be sorted, reduced, simplified, and/or organized based on second predetermined associations. Second predetermined associations 108 may include one or more of: positional data, timing of collected data, differences of data collected at different times, deltas between similar data, deltas between different data, deltas between the same data sources taken at different times, event data, location data, frequency data, color data, shape data, temperature data, size data, time of day data, date data, amount data, name data, type data, class data, logic data, Boolean logic data, price data, market data, company data, employee data, asset data, and/or product data. First and second conditionally weighted variables may include user defined or program defined associations which define extreme conditions such as greatest separation, least separation, greatest deviation, least deviation, no deviation, and other conditions which assist in the formation of gate-level logic programming. Upper and lower threshold limits may allow the data to be further filtered, sorted, and prepared to be used as an input to a compiler program. The sorted virtual input data 108 may then be used as in input to form simplified logic conditions allowing for dynamically compiled and programmed gate-level-logic within FPGAs, ASICs, processors, one or more programmable logic blocks, filters, and/or memory locations 116. Dynamic on-the-fly programming may be accomplished using re-configurable or partially re-configurable FPGAs, ASICs, or memory locations of traditional processors. Verilog, VHDL, gate-level-logic, C, C++, Java or other languages may be used to program the re-configurable FPGAs, ASICs, or memory locations of traditional processors. Sorted virtual data inputs 108 may be used as data inputs to a compiler program that produces the dynamic programming for the re-configurable FPGAs, ASICs, or memory locations of traditional processors. An input or question 112 may then be processed or filtered through dynamic filters or logic gates/states to produce a fast bi-stable logic output 118. Output 118 may be used to control devices, make decisions, purchase merchandise, authenticate identity, provide access control, and other uses as described in relation to FIGS. 3-5. Computing system 104 may include a combination of cloud computing, local device computing, remote device computing, local area computing, wide area computing, Internet computing, intranet computing and/or wireless network computing. The first predetermined associations and the second predetermined associations may be one or more of: statistical associations of the plurality of data inputs, industry associations of the plurality of data inputs, historically learned associations of the plurality of data inputs, or user selected associations of the plurality of data inputs. The first conditionally weighted variables and the second conditionally weighted variables may be assigned based on one or more of: changes in relation to time between the groups, changes in relation to time between the virtual data inputs within the group, a predicted rate of change of one or more of the groups, and/or a predicted rate of change of one or more of the virtual data inputs within each group. Computing system 104 may include servers, database servers, smart phones, computers, notebooks, tablets, cameras, sensors, optical sensors, smart locks, smart devices, alarms, appliances, and other network capable devices.

Figure 2:
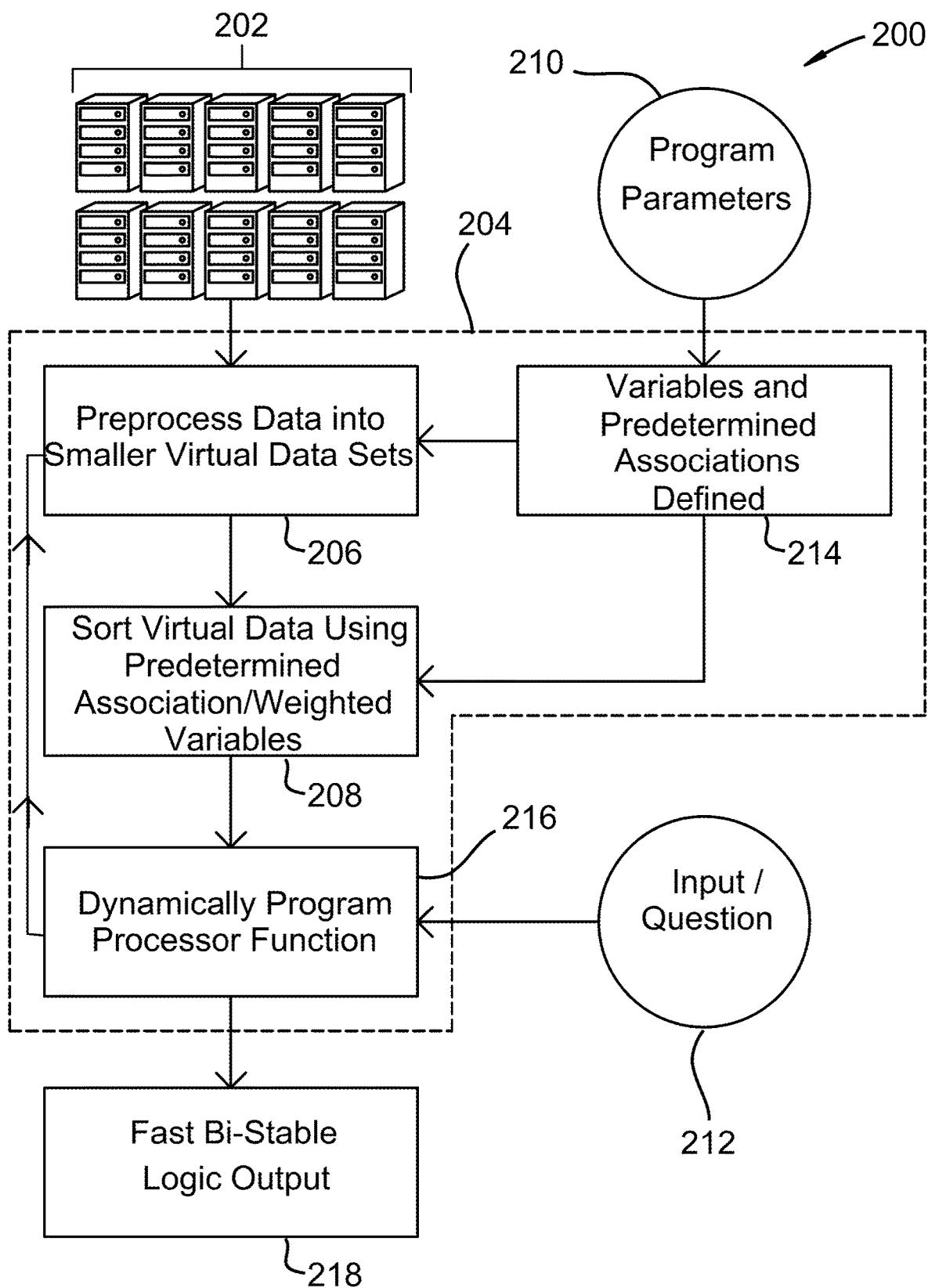
FIG. 2 shows a flow diagram in accordance with an embodiment of the invention.

FIG. 2 shows a flow diagram 200 in accordance with an embodiment of the invention. Ten or more data sources 202 may be obtained from the Internet, Internet sensors, Ethernet sensors, wireless sensors, mesh network devices, local network devices, wide area network devices, stored database records, Internet of Things (IoT) sensors, or from dynamic database records. Data 202 may be defined as networked data, stored data, or sensor data. Data 202 may be received by one or more preprocessors 206 and time and date stamped with intervals $T_1$ to $T_n$. Intervals $T_1$ to $T_n$ may represent actual collection times of data or may represent recursively restarted preprocessing cycles depending on the specific embodiment. Intervals $T_1$ to $T_n$ may be used to form one or more associations between data from the same data sources taken at different times and/or may represent data from various different data sources at similar and/or different times depending on the specific embodiment. Preprocessors 206 may be networked processors, a single device processor, Application Specific Integrated Circuits (ASICs), Field Programmable Gate Arrays (FPGA), or parallel processors used to preprocess data 202 into smaller virtual input sets or smaller data sets. Preprocessors 206 may receive indirect user instructions in the form of programming 214 or direct user instructions by way of input 210. User input 210 may represent programming parameters used to preprocess the data into smaller virtual data input sets 206. Such programming parameters may be used to define first predetermined associations. First predetermined associations may include associations between data within data set 202. The associations may allow filtering, truncating, sorting, extracting, defining, or refining of smaller sets of data from larger data set 202. Examples of first predetermined associations may include associations of one or more of: positional data, timing of collected data, differences of data collected at different times, deltas between similar data, deltas between different data, deltas between the same data sources taken at different times, event data, location data, frequency data, color data, shape data, temperature data, size data, time of day data, date data, amount data, name data, type data, class data, logic data, Boolean logic data, price data, market data, company data, employee data, asset data, and/or product data. The first predetermined association allows data 202 to be preprocessed into a smaller virtual data input set 206. The smaller virtual input data set may then be sorted, reduced, simplified, and/or organized based on second predetermined associations. Second predetermined associations 208 may include one or more of: positional data, timing of collected data, differences of data collected at different times, deltas between similar data, deltas between different data, deltas between the same data sources taken at different times, event data, location data, frequency data, color data, shape data, temperature data, size data, time of day data, date data, amount data, name data, type data, class data, logic data, Boolean logic data, price data, market data, company data, employee data, asset data, and/or product data. First and second conditionally weighted variables may include user defined or program defined associations which define extreme conditions such as greatest separation, least separation, greatest deviation, least deviation, no deviation, and other conditions which assist in the formation of gate-level logic programming. Upper and lower threshold limits may allow the data to be further filtered, sorted, and prepared to be used as an input to a compiler program. The sorted virtual input data 208 may then be used as in input to form simplified logic conditions allowing for dynamically compiled and programmed gate-level-logic within FPGAs, ASICs, processors, one or more programmable logic blocks, filters, and/or memory locations 216. Dynamic on-the-fly programming may be accomplished using re-configurable or partially re-configurable FPGAs, ASICs, or memory locations of traditional processors. Verilog, VHDL, gate-level-logic, C, C++, Java or other languages may be used to program the re-configurable FPGAs, ASICs, or memory locations of traditional processors. Sorted virtual data inputs 208 may be used as data inputs to a compiler program that produces the dynamic programming for the re-configurable FPGAs, ASICs, or memory locations of traditional processors. An input or question 212 may then be processed or filtered through dynamic filters or logic gates/states to produce a fast bi-stable logic output 218. Output 218 may be used to control devices, make decisions, purchase merchandise, authenticate identity, provide access control, and other uses as described in relation to FIGS. 3-5. Computing system 204 may include a combination of cloud computing, local device computing, remote device computing, local area computing, wide area computing, Internet computing, intranet computing and/or wireless network computing. The first predetermined associations and the second predetermined associations may be one or more of: statistical associations of the plurality of data inputs, industry associations of the plurality of data inputs, historically learned associations of the plurality of data inputs, or user selected associations of the plurality of data inputs. The first conditionally weighted variables and the second conditionally weighted variables may be assigned based on one or more of: changes in relation to time between the groups, changes in relation to time between the virtual data inputs within the group, a predicted rate of change of one or more of the groups, and/or a predicted rate of change of one or more of the virtual data inputs within each group. Computing system 204 may include servers, database servers, smart phones, computers, notebooks, tablets, cameras, sensors, optical sensors, smart locks, smart devices, alarms, appliances, and other network capable devices.

Figure 3:
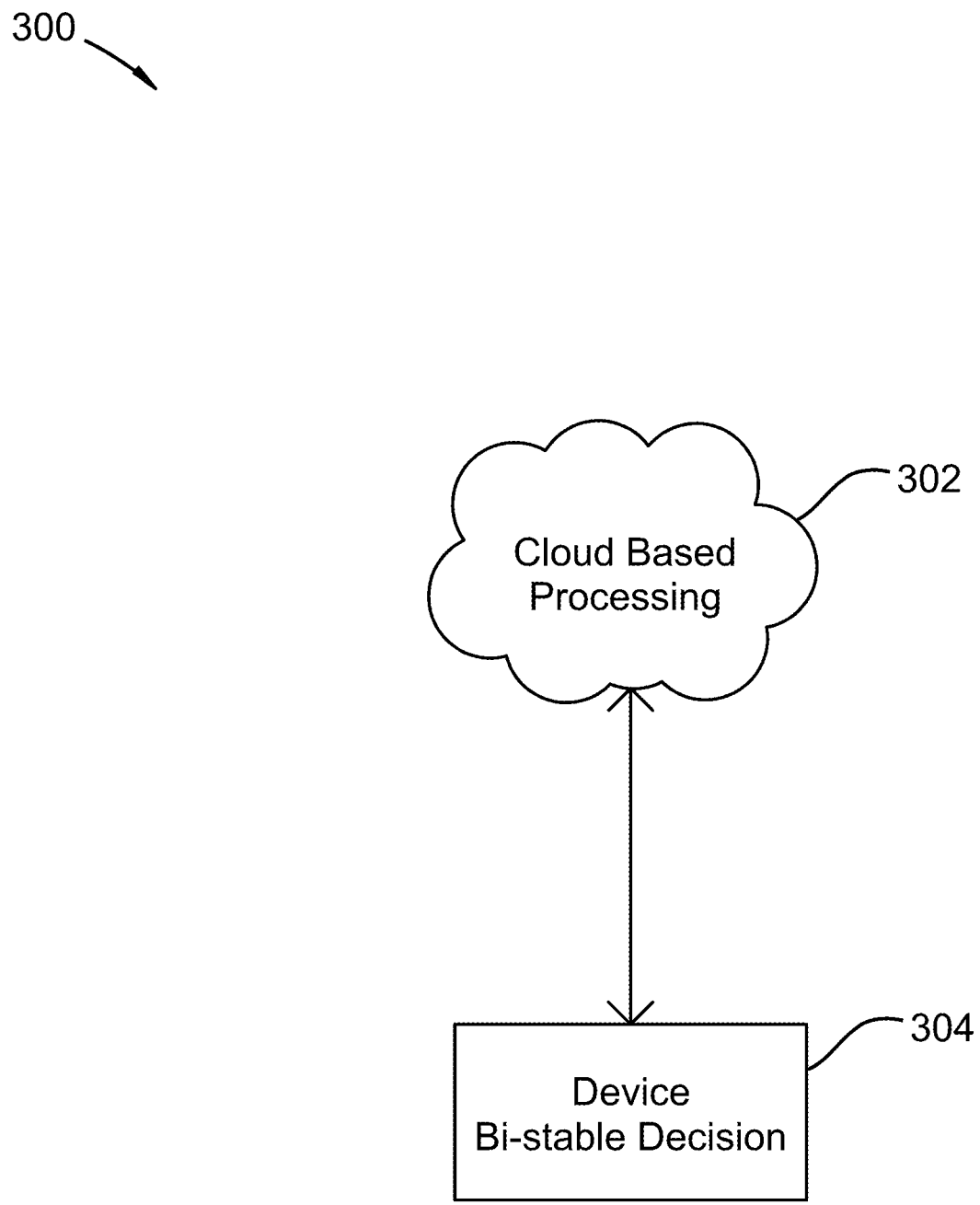
FIG. 3 shows a flow diagram in accordance with an embodiment of the invention.

FIG. 3 shows a flow diagram 300 in accordance with an embodiment of the invention. In an embodiment, identification data may be stored in the cloud 302. Identification information may include fingerprints, retinal eye scan data, palm print data, DNA data, or any other large data biometric identifier. Cloud processing 302 may reduce a retinal eye scan from 30 Megabytes to 30 Kilobytes keeping data needed to authenticate an individual, a biometric key. This key may have been made by cloud processing of the large data file using first and second predetermined (association) identifiers such as exact pixel positioning, pixel shape, and/or pixel intensity of a stored retinal eye scan. The virtual input data set of 30 Kilobytes may compiled into gate-level-logic and be wirelessly and dynamically loaded in an inexpensive re-configurable FPGA chip of an retinal eye access point. The user requesting entrance may then have his eye quickly scanned and the data filtered through the access point FPGA resulting in a quick bi-stable logic condition allowing access or denying access. The first predetermined associations and the second predetermined associations may be one or more of: statistical associations of the plurality of data inputs, industry associations of the plurality of data inputs, historically learned associations of the plurality of data inputs, or user selected associations of the plurality of data inputs. The first conditionally weighted variables and the second conditionally weighted variables may be assigned based on one or more of: changes in relation to time between the groups, changes in relation to time between the virtual data inputs within the group, a predicted rate of change of one or more of the groups, and/or a predicted rate of change of one or more of the virtual data inputs within each group.

Figure 4:
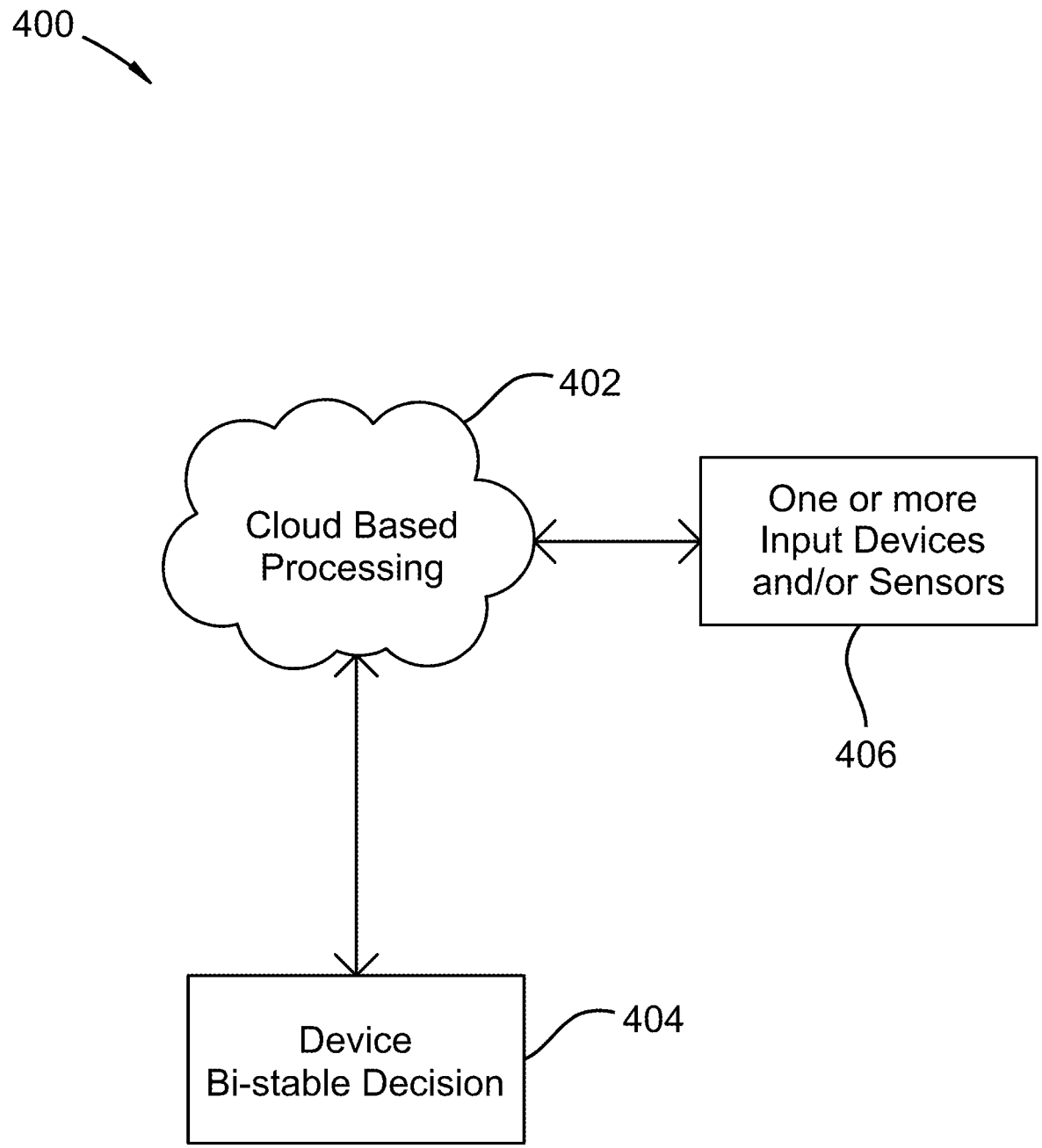
FIG. 4 shows a flow diagram in accordance with an embodiment of the invention.

FIG. 4 shows a flow diagram 400 in accordance with an embodiment of the invention. In another embodiment, sensor data 406 may be derived from imaging sensors and may be stored in the cloud 402 for the purpose of detecting fraud, biological identity, pharmaceutical drug creation, pharmaceutical drug testing, positional tracking, location tracking, navigation, electromagnetic imaging, medical procedures, and object detection. Cloud processing 402 may reduce large image sensor data to very small amounts only keeping data needed to perform a very specific logic function. This specific logic function may have been obtained by cloud processing of the large data files using first and second predetermined association and first and second conditionally weighted variables. First and second predetermined association and first and second conditionally weighted variables may include one or more of: pixel positioning, pixel shape, pixel intensity, positional data, timing of collected data, differences of data collected at different times, deltas between similar data, deltas between different data, deltas between the same data sources taken at different times, event data, location data, frequency data, color data, shape data, temperature data, size data, time of day data, date data, amount data, name data, type data, class data, logic data, Boolean logic data, price data, market data, company data, employee data, asset data, and/or product data. A small virtual input data set may be compiled into gate-level-logic and be wirelessly and dynamically loaded in an inexpensive re-configurable FPGA chip of one or more devices. The one or more devices may produce a fast bi-stable logic output derived from a large data set. The first predetermined associations and the second predetermined associations may be one or more of: statistical associations of the plurality of data inputs, industry associations of the plurality of data inputs, historically learned associations of the plurality of data inputs, or user selected associations of the plurality of data inputs. The first conditionally weighted variables and the second conditionally weighted variables may be assigned based on one or more of: changes in relation to time between the groups, changes in relation to time between the virtual data inputs within the group, a predicted rate of change of one or more of the groups, and/or a predicted rate of change of one or more of the virtual data inputs within each group.

Figure 5:
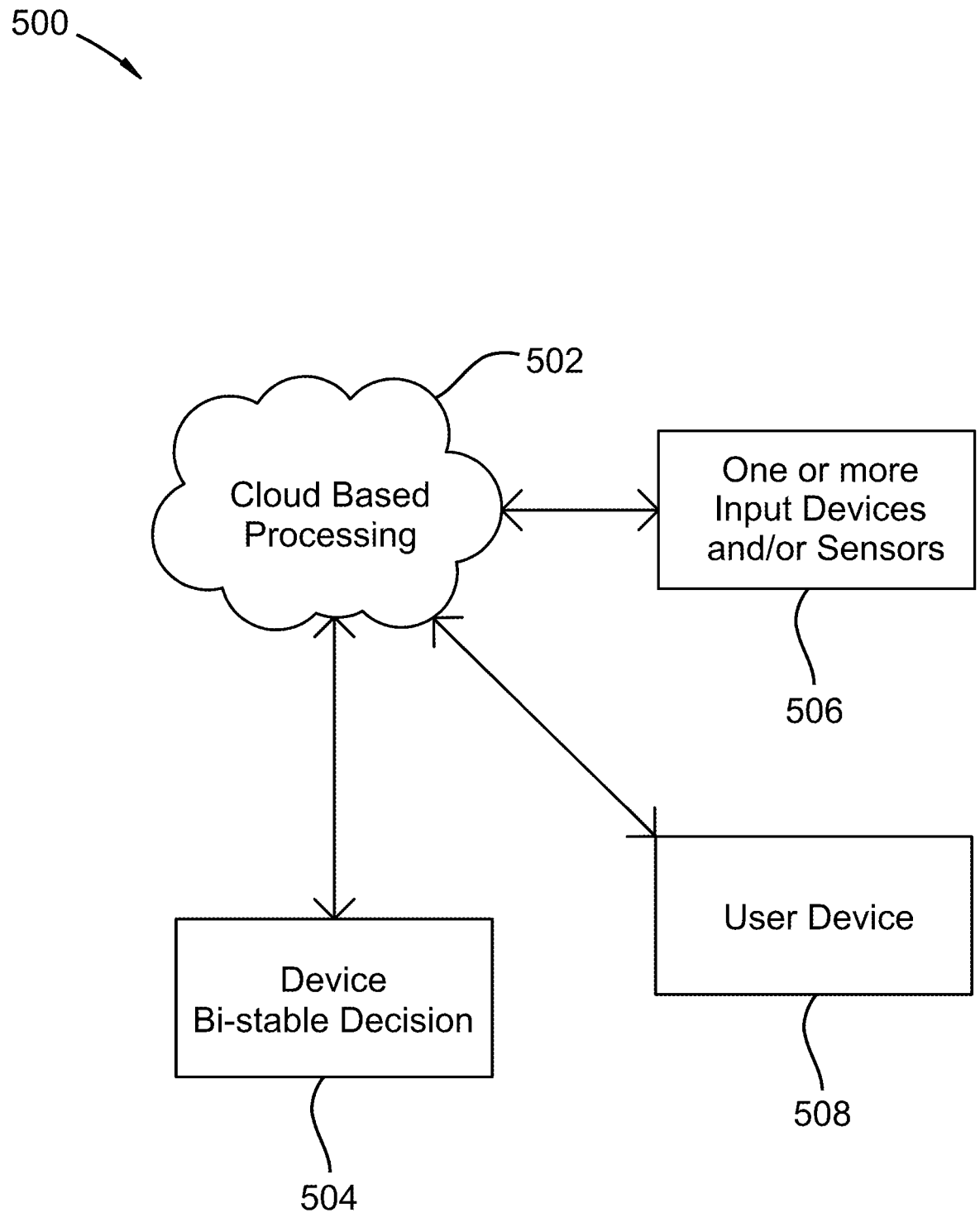
FIG. 5 shows a flow diagram in accordance with an embodiment of the invention.

FIG. 5 shows a flow diagram 500 in accordance with an embodiment of the invention. In another embodiment, a user device 508 selects first and second predetermined associations related to a specific home he wants to buy. The first predetermined association is the housing market condition in general and the second predetermined association is the exact address of the house. The first and second conditionally weighted variables are chosen to be value thresholds, historical rates of change of the housing market sector, and the specific home real-time value change over minutes. Additional user settings may include: predicted future value, additional data inputs, timing or refreshing of the preprocessing. To start preprocessing, data is received into the cloud based processing 502 from input sensors and input devices. Devices 506 may include Internet new reports, historical database records, smart phones, networks, or other information channels such as television, radio, media outlets, etc. The user 508 sets processing parameters in the cloud based processing and the cloud generates compiled gate-level-logic that is recursively downloaded into his watch 504 and updated every 1 minute. The user can push a button on his watch 504 and find out if the house meets his predefined conditions for purchase in near real-time. An automated purchase action may be implemented by user server settings. Device 504 could be any electronic device such as a smart phone, watch, tablet, computer, vehicle computer, etc. Device 504 and device 508 may be the same electronic device. Similar buy/sell financial transactions could also be implemented by the disclosed systems, devices, and methods.

The apparatus and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of improving processing efficiency of decision making within a computing system comprising:
one or more processors with non-transitory memory programmed to:
preprocess a plurality of data inputs at time T1 to time Tn;
create a reduced plurality of virtual data inputs based on first predetermined associations of the plurality of data inputs;
sort the virtual data inputs into groups based on second predetermined associations within the reduced plurality of virtual data inputs;
assign first conditionally weighted variables to each of the groups based at least in part on the second predetermined associations;
assign second conditionally weighted variables to each virtual data input of each group based at least in part on a relation to the first conditionally weighted variables of each group;
create upper and lower threshold limits for each group related to the first conditionally weighted variables or the second conditionally weighted variables;
eliminate all virtual data inputs that fall outside of the upper or the lower threshold limits within each group;
update a hierarchical processing decision tree based on the reduced plurality of virtual data inputs;
start hierarchical processing within the computing system based on the updated hierarchical processing decision tree;
recursively restart the preprocessing of the plurality of data inputs;
wherein the hierarchical processing produces a real-time bi-stable decision based on the plurality of data inputs; and
wherein the real-time bi-stable decision causes one or more of the following: unlocking of a secure entry, identity authentication, yes/no decisions, purchase transaction decisions, sell transaction decisions, biological identity decisions, fraud decisions, or providing of a bi-stable output.

2. The method of claim 1, wherein the plurality of data inputs are transmitted to the computing system from 10 or more servers in different physical locations.

3. The method of claim 1, wherein the virtual data inputs are stored in a database server.

4. The method of claim 1, wherein the updated hierarchical processing decision tree is stored in one or more of a user device, a database server, and ASIC (application specific integrated circuit) or an FPGA (field programmable gate array).

5. The method of claim 1, wherein the updated hierarchical processing decision tree is part of a processing blockchain or a parallel processing filter.

6. The method of claim 1, wherein the plurality of data inputs are transmitted to the computing system from one or more imaging sensors.

7. The method of claim 6, wherein the imaging sensors are used to gather data related to one or more of: fraud, biological identity, pharmaceutical drug creation, pharmaceutical drug testing, positional tracking, location tracking, navigation, electromagnetic imaging, medical procedures, and object detection.

8. The method of claim 1, wherein the plurality of data inputs are transmitted to the computing system from one or more biological sensors.

9. The method of claim 1, wherein the plurality of data inputs are transmitted to the computing system from one or more Internet devices.

10. The method of claim 1, wherein time T1 to time Tn represents one or more of sets of time in: milliseconds, seconds, minutes, hours, days, weeks, and/or years.

11. The method of claim 1, wherein the first predetermined associations are one or more of: statistical associations of the plurality of data inputs, industry associations of the plurality of data inputs, historically learned associations of the plurality of data inputs, or user selected associations of the plurality of data inputs.

12. The method of claim 1, wherein the second predetermined associations are one or more of: statistical associations of the plurality of data inputs, industry associations of the plurality of data inputs, historically learned associations of the plurality of data inputs, or user selected associations of the plurality of data inputs.

13. The method of claim 1, wherein the first conditionally weighted variables are assigned based on one or more of: changes in relation to time between the groups, changes in relation to time between the virtual data inputs within the group, a predicted rate of change of one or more of the groups, and/or a predicted rate of change of one or more of the virtual data inputs within each group.

14. The method of claim 1, wherein the second conditionally weighted variables are assigned based on one or more of: changes in relation to time between the groups, changes in relation to time between the virtual data inputs within the group, a predicted rate of change of one or more of the groups, and/or a predicted rate of change of one or more of the virtual data inputs within each group.

15. The method of claim 1, wherein the updated hierarchical processing decision tree causes at least one function of the one or more processors to be updated.

16. The method of claim 1, wherein the updated hierarchical processing decision tree changes a physical processing feature of the at least one or more processors.

17. The method of claim 1, wherein the updated hierarchical processing decision tree creates a new processor function to be added to the at least one or more processors.

18. The method of claim 1, wherein the updated hierarchical processing decision tree causes the at least one or more processors to update a filtering algorithm within the at least one or more processors.

\* \* \* \* \*